(12) United States Patent
Hwang et al.

(10) Patent No.: US 7,606,125 B2
(45) Date of Patent: Oct. 20, 2009

(54) METHOD OF AND DRIVE FOR RECORDING MEDIUM DEFECT MANAGEMENT, AND DEFECT MANAGED RECORDING MEDIUM

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/951,741

(22) Filed: Dec. 6, 2007

(65) Prior Publication Data

US 2008/0089197 A1 Apr. 17, 2008

Related U.S. Application Data

(63) Continuation of application No. 11/745,124, filed on May 7, 2007, which is a continuation of application No. 10/824,657, filed on Apr. 15, 2004, now Pat. No. 7,266,064.

(60) Provisional application No. 60/472,122, filed on May 21, 2003.

(30) Foreign Application Priority Data

Apr. 26, 2003 (KR) ............................... 2003-26590
Jul. 18, 2003 (KR) ............................... 2003-49130

(51) Int. Cl.
*G11B 15/52* (2006.01)
(52) U.S. Cl. ............... 369/47.14; 369/53.15; 369/275.3
(58) Field of Classification Search ........................ None
See application file for complete search history.

(56) References Cited

U.S. PATENT DOCUMENTS 5,940,853 A 8/1999 Ooi et al.
6,341,109 B1 1/2002 Kayanuma
6,667,939 B1 12/2003 Miyamoto
6,842,580 B1 1/2005 Ueda et al.
6,883,111 B2 4/2005 Yoshida et al.
7,397,738 B2 * 7/2008 Hwang et al. ............ 369/47.14

(Continued)

FOREIGN PATENT DOCUMENTS

JP 2001-351334 12/2001

(Continued)

OTHER PUBLICATIONS

Office Action issued by Taiwanese Patent Office in Taiwanese Patent Application No. 93110806 on Sep. 22, 2006.

(Continued)

*Primary Examiner*—Paul Huber
(74) *Attorney, Agent, or Firm*—Stein McEwen, LLP

(57) ABSTRACT

A method of and drive for recording medium defect management, and a defect managed recording medium. The defect management method includes: writing first state information that specifies that an update cycle of a temporary defect management structure (TDMS) is open when updating of the TDMS begins, the TDMS containing information regarding temporary defect management; updating the TDMS when data is written to or read from the information storage medium; and writing second state information that specifies that the update cycle of the TDMS is closed, when the updating of the TDMS is completed.

3 Claims, 5 Drawing Sheets

U.S. PATENT DOCUMENTS

| | | | |
|---|---|---|---|
| 2002/0136537 | A1 | 9/2002 | Takahashi |
| 2004/0174793 | A1 | 9/2004 | Park et al. |
| 2004/0208097 | A1* | 10/2004 | Kim et al. ................. 369/53.15 |
| 2006/0114810 | A1* | 6/2006 | Gotoh et al. .............. 369/275.3 |

FOREIGN PATENT DOCUMENTS

| | | |
|---|---|---|
| KR | 2004-28469 | 3/2004 |
| WO | WO 00/54274 | 9/2000 |
| WO | WO 2004/029941 | 4/2004 |
| WO | WO 2004/079740 | 9/2004 |

OTHER PUBLICATIONS

U.S. Appl. No. 11/432,328, filed May 12, 2006, Sung-Hee Hwang et al.

U.S. Appl. No. 11/226,224, filed Sep. 15, 2005, Sung-Hee Hwang et al.

U.S. Appl. No. 11/432,470, filed May 12, 2006, Sung-Hee Hwang et al.

U.S. Appl. No. 10/824,657, filed Apr. 15, 2004, Sung-Hee Hwang et al.

U.S. Appl. No. 11/745,124, filed May 7, 2007, Sung-Hee Hwang et al.

U.S. Appl. No. 11/951,789, filed Dec. 6, 2007, Sung-Hee Hwang et al.

U.S. Appl. No. 11/951,718, filed Dec. 6, 2007, Sung-Hee Hwang et al.

U.S. Appl. No. 11/951,767, filed Dec. 6, 2007, Sung-Hee Hwang et al.

European Search Report dated Jul. 18, 2008 of the European Patent Application No. 04728977.2.

* cited by examiner

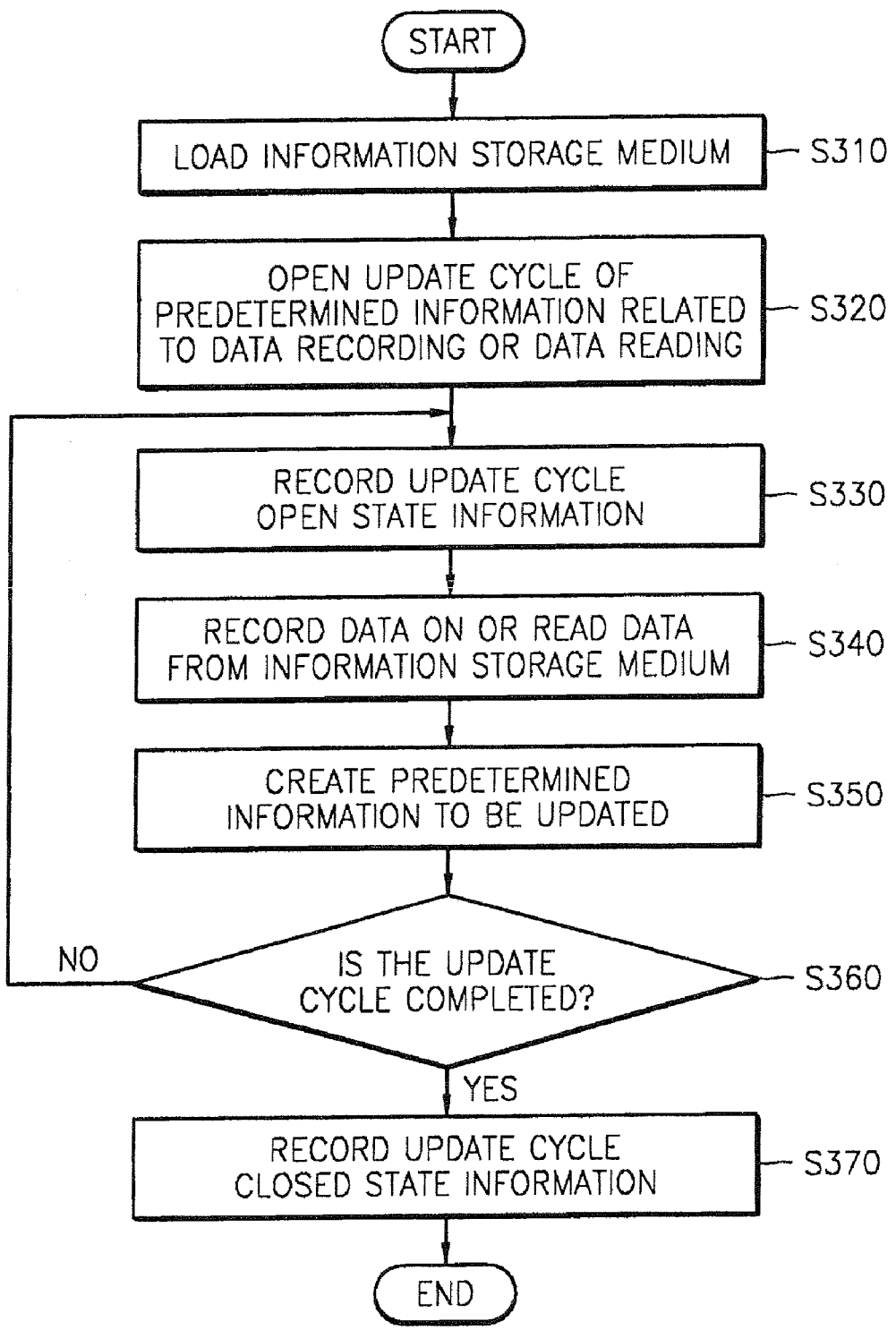

METHOD OF AND DRIVE FOR RECORDING MEDIUM DEFECT MANAGEMENT, AND DEFECT MANAGED RECORDING MEDIUM

CROSS-REFERENCE TO RELATED APPLICATIONS

This application is a continuation of U.S. application Ser. No. 11/745,124, filed May 7, 2007, now pending, which is a continuation of U.S. application Ser. No. 10/824,657, filed Apr. 15, 2004, now U.S. Pat. No. 7,266,064, which claims the priority of Korean Patent Application Nos. 2003-26590 filed on Apr. 26, 2003 and 2003-49130 filed on Jul. 18, 2003 in the Korean Intellectual Property Office, and U.S. Provisional Application No. 60/472,122 filed on May 21, 2003 in the USPTO, the disclosures of which are incorporated herein in their entirety by reference.

BACKGROUND OF THE INVENTION

1. Field of the Invention

The present invention relates to a defect management method for a recording medium, a recording medium drive, and a recording medium therefor and, more particularly, to a defect management method in which a primary temporary defect management area and a secondary temporary defect management area are recorded on the recording medium.

2. Description of the Related Art

Defect management is the process of rewriting data stored in a user data area of a disc in which a defect exists to a new portion of the user data area, thereby compensating for data loss caused by the defect.

In general, defect management is performed using linear replacement or slipping replacement. In linear replacement, the user data area in which a defect exists is replaced with a spare data area having no defects. In slipping replacement, the user data area with the defect is slipped and the next user data area having no defects is used.

Both linear replacement and slipping replacement are, however, applicable only to discs such as a DVD-RAM/RW, on which data can be repeatedly recorded and recording can be performed using a random access method.

In the case of write once read many (WORM) storage media (hereinafter referred to as "write once recording media"), data cannot be rewritten to the same position since the recording capacities of these media are limited. Therefore, effective defect management is required, and many efforts have been made to developing a defect management method for write once recording media, using a recording medium drive.

The defect management for write once recording media is performed using a verify-after-write method. More specifically, a recording medium drive records data in specified units on a write once recording medium, and then verifies the recorded data so as to detect the position of a portion of the medium in which a defect exists. Next, the drive rerecords the data recorded in the portion having the defect in a spare area. Next, the drive creates a Temporary DeFect List (TDFL) that describes the positions of the area having the defect and the spare area that is a substitute for the area having the defect, and creates temporary defect management information (TDDS) specifying the recording position of the TDFL. The combination of the TDFL and the TDDS is called a Temporary Defect Management Structure (TDMS).

Next, the drive stores the created TDFL or TDDS in a memory and records the stored information in a Temporary Defect Management Area (TDMA) of the write once recording medium when the amount of information stored in the memory reaches a predetermined level. The TDMS is updated whenever data is recorded on the write once recording medium.

The write once recording medium is finalized when data cannot be further recorded thereon or a user does not want to further record data thereon. During the finalizing of the write once recording medium, a TDMS lastly recorded in the TDMA is copied to a Defect Management Area (DMA).

The defect management performed by the recording medium drive on a write once recording medium is, however, abnormally discontinued when a power supplied to the recording medium drive is interrupted due to an abnormal event such as, for example, a power failure. For example, the recording medium drive may undergo a power shortage prior to recording a TDFL or a TDDS, which is created during data recording on the write once recording medium, in a TDMA. In this case, the TDMS will not be successfully updated. Further, when the write once recording medium is reloaded into the recording medium drive after restoration of a power supply, the drive is not capable of checking whether the defect management has been abnormally terminated or not.

BRIEF SUMMARY

The present invention provides a defect management method for write once recording media, during which abnormal termination of the defect management caused by an abnormal event such as, by way of non-limiting example, a power shortage, is checked.

The present invention also provides a recording medium drive which enables an easy check on abnormal termination of defect management caused by an unavoidable accident.

The present invention also provides an information storage medium in which abnormal termination of defect management caused by an unavoidable accident can be easily checked.

According to an aspect of the present invention, there is provided a defect management method for an information storage medium, including: writing first state information that specifies that an update cycle of a temporary defect management structure (TDMS) is open when updating of the TDMS begins, the TDMS containing information regarding temporary defect management; updating the TDMS when data is one of written to and read from the information storage medium; and writing second state information that specifies that the update cycle of the TDMS is closed, when the updating of the TDMS is completed.

The first state information may be written in response to either a command of opening the TDMS update cycle or a command of writing data on or reading data from the information storage medium.

The updating may include writing the first state information based on the updated TDMS.

The second state information may be written in response to a command of ejecting the information storage medium.

According to another aspect of the present invention, there is provided a defect management method for an information storage medium, the method including: writing first state information, which specifies that an update cycle of data is open, to an area of the information storage medium when updating of the data begins during the writing of data to or the reading data from the information storage medium; updating the predetermined data, which is generated when data is one of written to and read from the information storage medium, by writing the data to the information storage medium; and writing second state information, which specifies that the update cycle of the data is closed, to the area when the updating of the information is completed.

According to yet another aspect of the present invention, there is provided a drive including: a pickup that one of writes data on and reads data from a loaded information storage medium; and a controller that: controls the pickup to write first state information, which specifies that a temporary defect management structure (TDMS) update cycle is open, in an area of the information storage medium when updating of a TDMS containing information regarding temporary defect management begins; controls the pickup to update the TDMS when data is written to or read from the information storage medium; and controls the pickup to write second state information, which specifies that the TDMS update cycle is closed, in the area when the updating of the TDMS is completed.

The controller may control the pickup to write the first state information in the area, in response to either a command of opening the TDMS update cycle or a write/read command.

The controller may control the pickup to write the first state information in the area based on an updated TDMS when the TDMS is updated during writing of data to or reading of data from the information storage medium.

The controller may control the pickup to write the second state information in the area, in response to either a command of ejecting the information storage medium or a command of closing the TDMS update cycle.

According to still another aspect of the present invention, there is provided a drive including: a pickup that writes data to or reads data from a loaded information storage medium; and a controller that: controls the pickup to write first state information, which specifies that an update cycle of information is open, in an area of the information storage medium when updating of the information begins during the writing of the data to or the reading of the data from the information storage medium; controls the pickup to update the predetermined data, which is generated when data is one of written to and reading data from the information storage medium, by writing the information on the information storage medium; and controls the pickup to write second state information, which specifies that the update cycle of the information is closed, in the area when the updating of the information is completed.

According to still another aspect of the present invention, there is provided an information storage medium that includes a lead-in area, a user data area, and a lead-out area, on which a temporary defect management structure (TDMS) containing information regarding temporary defect management and update cycle state information regarding the TDMS are written, the update cycle state information specifying whether the update cycle of the TDMS is open or closed.

The TDMS may contain temporary defect management information (TDDS) and a temporary defect list (TDFL) and the TDMS update cycle state information is contained in the TDDS.

At least one TDMA may be formed in at least one of the lead-in area, the user data area, and the lead-out area, and the TDMS and the TDMS update cycle state information may be written in the TDMA.

According to still another aspect of the present invention, there is provided an information storage medium including information related to and generated during writing of data or reading of written data; and update cycle state information that specifies an update cycle of the information is open or closed, and is written based on the information.

According to yet another aspect of the present invention, there is provided a method of determining whether recording of data was abnormally terminated on an information storage medium due to an abnormal event. The method includes: reading second state information that specifies that an update cycle of the TDMS is closed, when updating of the TDMS is completed. First state information that specifies that an update cycle of a temporary defect management structure (TDMS) is open is written when the updating of the TDMS begins, the TDMS containing information regarding temporary defect management. The TDMS is updated when data is one of written to and read from the information storage medium.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 is a flowchart illustrating a defect management method for an information storage medium, according to an embodiment of the present invention.

DETAILED DESCRIPTION OF EMBODIMENTS

Figure 1:
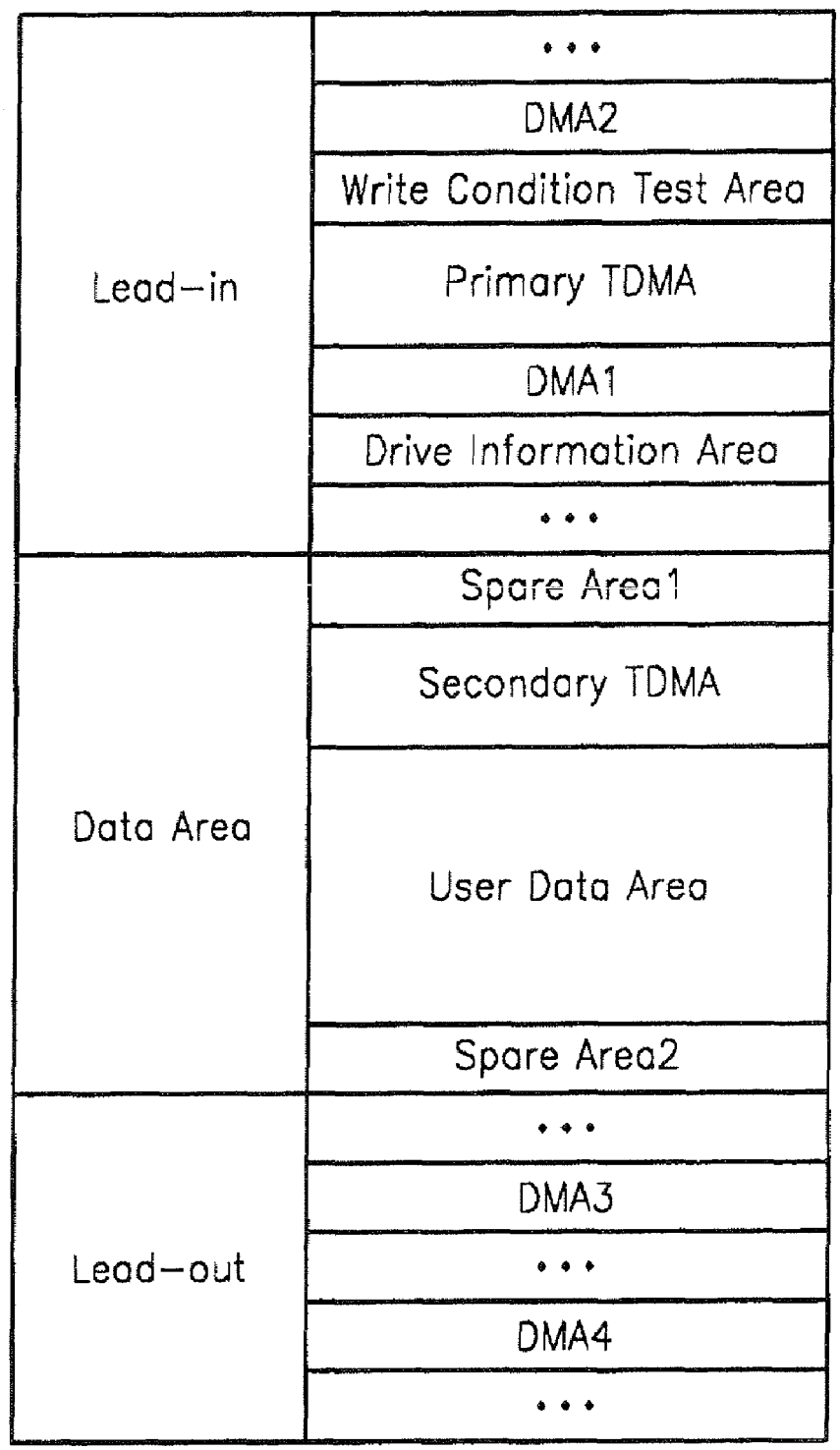
FIG. 1 illustrates a data structure of a single record layer of a write once recording medium, according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

In this disclosure, defect management according to various embodiments of the present invention is described with respect to a write once recording medium that is an example of an information storage medium. However, it is to be understood that other media may be used.

FIG. 1 illustrates a data structure of a single record layer representation of a write once recording medium, according to an embodiment of the present invention. Referring to FIG. 1, the write once recording medium includes a lead-in area, a data area, and a lead-out area. The lead-in area includes a defect management area (DMA) #1, a DMA #2, a write condition test area, a primary Temporary Defect Management Area (TDMA), and a drive information area.

In the data area, a spare area #1, a spare area #2, a secondary TDMA, and a user data area are formed. In the lead-out area, a DMA #3 and a DMA #4 are formed.

In general, a rewritable recording medium includes DMAs but does not include a temporary DMA (TDMA), whereas TDMAs are additionally allocated to a write once recording medium, in addition to DMAs, in consideration of the features of this medium.

More specifically, in the case of a write once recording medium, data recording is not allowed at a position where data has already been recorded. Thus, when information regarding a newly generated defect needs to be updated during data recording, a recording medium drive reads lastly recorded defect information and updates present defect information by additionally recording the newly generated defect information in a new cluster. For this reason, as data is more often recorded on the write once recording medium, the amount of defect information accumulates and becomes greater.

Meanwhile, since a DMA formed in a conventional rewritable recording medium has a small recording capacity, the DMA is usable as an area in which defect management is performed. Therefore, a TDMA whose recording capacity is larger than the recording capacity of the DMA is additionally allocated to the write once recording medium.

In the DMA, a temporary defect management structure (TDMS) lastly recorded in the TDMA is recorded during finalizing of the write once recording medium. In this way, the recording of data on a write once recording medium using a recording medium drive is enabled and the time spent on initializing of the write once recording medium is reduced.

The initializing of a recording medium is a process of reading data from a lead-in area or a lead-out area and determining how to manage the recording medium and write data to or read data from the recording medium. Therefore, as the amount of information recorded in the lead-in area or the lead-out area of a recording medium increases, more time is spent on initializing of the recording medium after loading the recording medium into a recording medium drive. A speed of searching for data recorded in a DMA is still faster than that of searching for data recorded in a TDMA with a large recording capacity.

Referring to FIG. 1, the write once recording medium includes two TDMAs, i.e., a primary TDMA and secondary TDMAs, in which the TDMS is recorded. As mentioned above, the TDMS contains a Temporary DeFect List (TDFL) and temporary defect management information (TDDS). The TDFL specifies the positions of an area having a defect and a spare area that is a substitute for the area having the defect, and the TDDS specifies the recording position of the TDFL.

The TDMS contains a Space Bit Map (SBM) using bit values to indicate whether data is recorded in clusters that constitute a whole recording area of the write once recording medium, in addition to the TDDS and the TDFL. The SBM is recordable either in an additional cluster or in a cluster containing the TDMS.

Inclusion of the secondary TDMA into the data area is optional depending on the decision of a user or a drive manufacturer. The reason why the inclusion of the secondary TDMA depends on the decision of a user or a drive manufacturer, is to enable the user/disc manufacturer to appropriately use the write once recording medium.

The spare areas #1 and #2 are allocated to the data area during initializing of the write once recording medium when defect management is performed using the recording medium drive.

Figure 2:
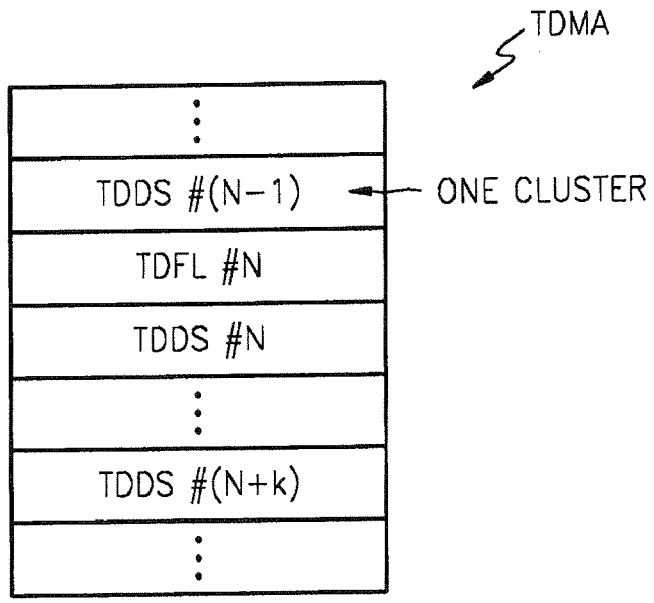
FIG. 2 illustrates an example of a data structure of information recorded in a temporary defect management area (TDMA)

FIG. 2 illustrates an example of a data structure of information recorded in a TDMA. Referring to FIG. 2, TDDSs and TDFLs are recorded in the TDMA in cluster units. In the TDMA, an area in which the TDDS is recorded and an area in which the TDFLs are recorded are not additionally divided, i.e., they are recorded in the same space of the TDMA. Therefore, the respective TDDSs and TDFLs are recorded in at least one cluster unit in the sequence in which they are generated (N and k are integers more than 1).

Figure 3:
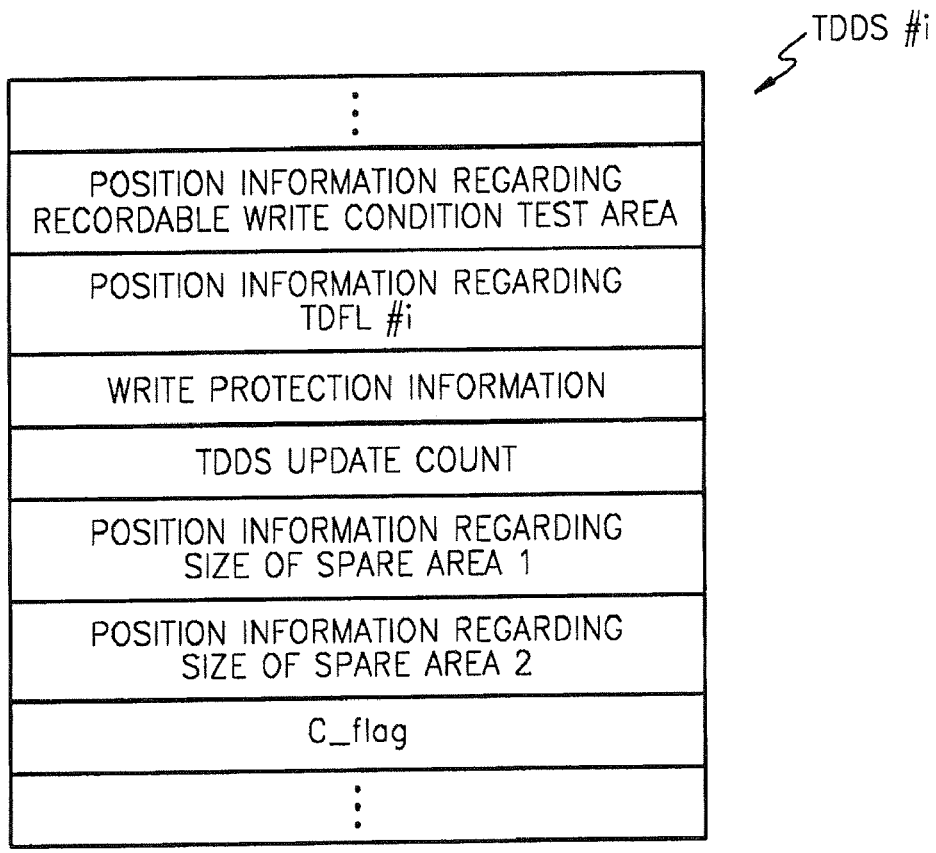
FIG. 3 illustrates an example of a data structure of temporary defect management information (TDDS)

FIG. 3 illustrates an example of a data structure of a TDDS illustrated in FIG. 2. Referring to FIG. 3, a TDDS #i (i is an integer more than 0) specifies the position of a recordable write condition test area, the position of a TDFL #i corresponding to the TDDS #i, write protection information, an update count indicating the number of updating the TDDS #i, the sizes of spare areas #1 and #2 allocated to a data area, C_flag, and so on.

As used in this detailed description, C_flag stands for a "consistency flag" representing the state of a TDMS update cycle. C_flag is described in detail later.

Although not shown in the drawings, according to this embodiment of the present invention, areas formed in the single record layer of the write once recording medium of FIG. 1 are also included in a double record layer of a write once recording medium. In the double record layer of the write once recording medium, an inner area #0, a data area #0, and an outer area #0 are sequentially formed in a first record layer from the inner part to the outer part thereof, and an outer area #1, a data area #1, and an inner area #1 are sequentially formed in a second record layer from the inner part to the outer part thereof.

Accordingly, defect management according to this embodiment of the present invention is performable in a write once recording medium with a double record layer. A primary TDMA of the second record layer is usable when a primary TDMA of the first record layer is full of data, and a secondary TDMA of the second record layer is used when a secondary TDMA of the first record layer is full of data.

Figure 4:
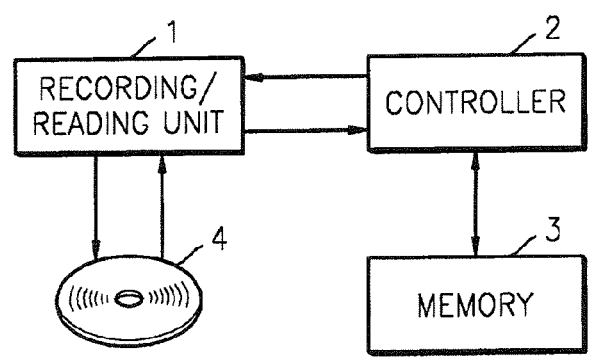
FIG. 4 is a block diagram of a drive performing defect management on a write once recording medium, according to an embodiment of the present invention.

FIG. 4 is a block diagram of a drive performing defect management on a write once recording medium, according to an embodiment of the present invention. Referring to FIG. 4, the apparatus includes a recording/reading unit 1, a controller 2, and memory 3.

The recording/reading unit 1 writes data to a write once recording medium 4 that is an information storage medium, and reads back the data from the write once disc 4 to verify the written data.

The controller 2 performs defect management on data recorded on the write once recording medium 4 using a TDMA formed in the write once recording medium 4.

In this embodiment, the controller 2 uses a verify-after-write method in which data is written on the write once recording medium 4 in specified units and the written data is verified to detect an area of the write once recording medium 4 having a defect. More specifically, the controller 2 writes user data on the write once recording medium 4 in specified units, verifies the written user data to detect an area of the write once disc 4 in which a defect exists, and creates a TDFL and a TDDS that describe the position of the area having the defect. Next, the controller 2 stores the created TDFL and TDDS in the memory 3. If the amount of the stored information reaches a predetermined level, the controller 2 writes the stored information in the TDMA of the write once recording medium 4.

Figure 5:
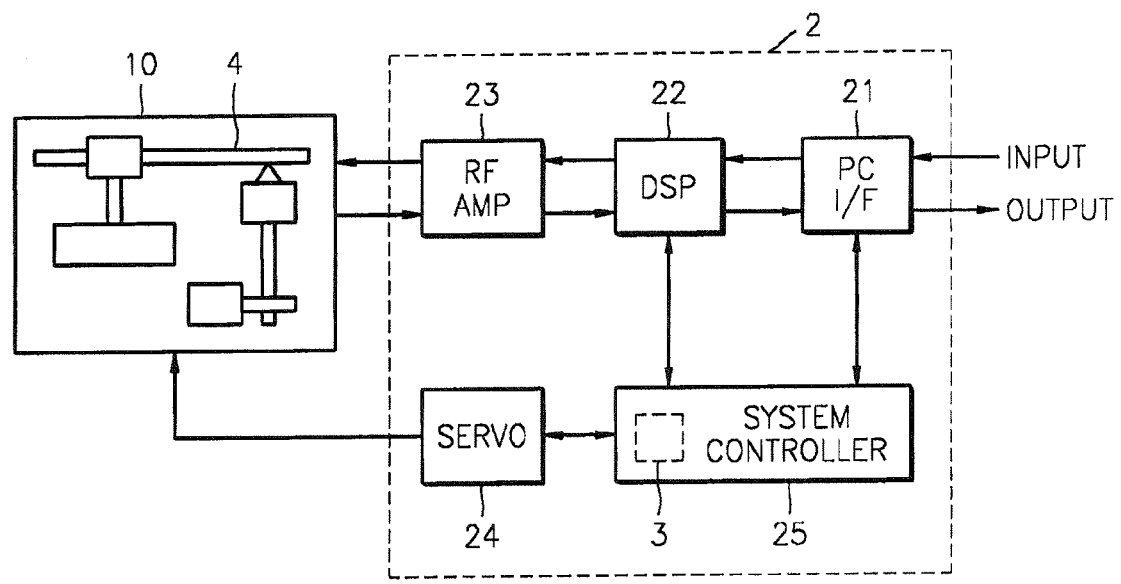
FIG. 5 is a detailed block diagram of the drive shown in FIG. 4.

FIG. 5 is a detailed block diagram of the drive, shown in FIG. 4, which carries out defect management on a write once recording medium, according to an embodiment of the present invention. Referring to FIG. 5, the recording medium drive includes a pickup 10 corresponding to the recording/reading unit 1 of FIG. 4. A write once recording medium 4 is loaded into the pickup 10. Also, the drive includes a controller 2 in which a PC I/F 21, a digital signal processor (DSP) 22, a radio frequency (RF) amplifier (AMP) 23, a servo 24, and a system controller 25 are installed. A memory 3 is included in the system controller 25 of the controller 2.

During a write operation, the PC I/F 21 receives data to be recorded and a write command from a host (not shown). The system controller 25 initializes the write once recording medium 4 required for the write operation. The DSP 22 receives the data to be recorded from the PC I/F 21; error correction code (ECC) encodes the data by incorporating additional data, such as parity for error correction, into the data; and modulates the ECC encoded data using a specified method. The RF AMP 23 converts the data output from the DSP 22 into an RF signal. The pickup 10 writes the RF signal output from the RF AMP 23 to the write once recording medium 4. The servo 24 receives a servo control command from the system controller 25 and performs servo control with respect to the pickup 10. Also, in order to perform defect management during the write operation, the system controller 25 instructs the pickup 10 to read the data from the write once recording medium 4 or to write information such as temporary management information to the write once recording medium 4.

Further, the system controller 25 instructs the pickup 100 to write a TDMS, containing TDDS and a TDFL, which is lastly recorded in a TDMA, so as to finalize the write once recording medium 4 when a user command is given or predetermined disc finalizing conditions are satisfied.

During a read operation, the PC I/F 21 receives a read command from the host. The system controller 25 performs disc initialization required for the read operation. The pickup 10 illuminates a laser beam on the write once recording medium 4 and obtains and outputs an optical signal from the laser beam reflected from the write once recording medium 4. The RF amplifier 23 converts the optical signal output from the pickup 10 into an RF signal, provides data modulated from the RF signal to the DSP 22, and provides a servo signal, for servo control, obtained from the RF signal to the servo 24. The DSP 22 demodulates the modulated data, performs ECC encoding on the demodulated data, and outputs the ECC encoded data. The servo 24 performs servo control on the pickup 10, in response to the servo signal output from the RF amplifier 23 and the servo control command output from the system controller 25. The PC I/F 21 sends the data received from the DSP 22 to the host. Also, the system controller 25 may instruct the pickup 10 to read information regarding defect management from the write once recording medium 4 during the read operation. The system controller 25 manages the whole system during the recording/reading operation.

A defect management method for write once recording media will now be described.

The present invention introduces a consistency flag (hereinafter referred to as 'C_flag') that is information specifying a TDMS update cycle and the TDMS update cycle states so as to determine whether defect management is abnormally discontinued due to an abnormal event during recording data on an information storage medium.

Figure 6:
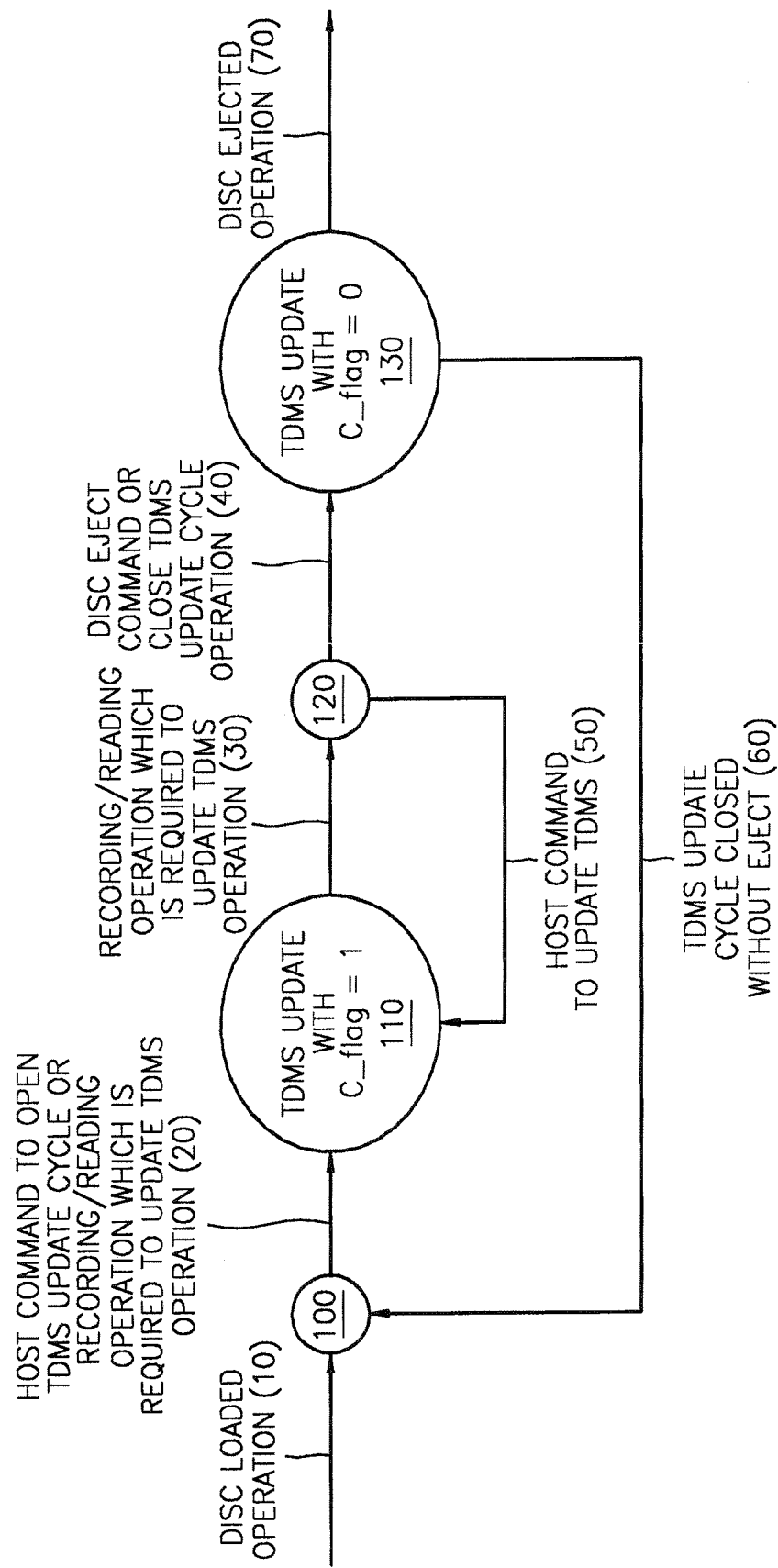
FIG. 6 illustrates states of a write once recording medium on which defect management is performed, according to an embodiment of the present invention.

FIG. 6 illustrates states of a write once recording medium on which defect management is performed, according to an embodiment of the present invention. Referring to FIG. 6, a TDMS describes two states of the write once recording medium: a TDMS update cycle open state having C_flag='1', and a TDMS update cycle closed state having C_flag='0'. The value of C_flag is determined and recorded according to the state of updated TDMS. When a write once recording medium is loaded into a recording medium drive and the C_flag, which is the state information regarding an updated TDMS, is '1', the drive considers that an abnormal event such as a power failure occurred during use of the recording medium and thus defect management was not normally completed.

Referring to FIGS. 4 and 6, a defect management method for write once recording media, according to a another embodiment of the present invention, will now be described in detail. First, when a write once recording medium 4 is loaded into a recording medium drive (operation 10), the TDMS update cycle reaches a state 100. The state 100 indicates that data has never been recorded on the write once recording medium 4, or indicates that the write once recording medium 4 enters the TDMS update cycle closed state having C_flag=0 which is lastly recorded in the TDMS when data has been recorded and defect management is successfully performed therein.

If data has never been recorded on the write once recording medium 4, the controller 2 records, in a first cluster of a primary TDMA, C_flag=0 and information that defect management is performed using the recording medium drive, during initializing of the write once recording medium 4. C_flag is recorded in the TDDS as mentioned above with reference to FIGS. 2 and 3.

According to this embodiment, a TDDS having C_flag=1 is recorded and the write once recording medium 4 enters a state 110, so that the TDMS update cycle is open in response to a host command or according to a recording/reading operation (operation 20) and the write once recording medium 4 enters the TDMS update cycle open state.

Two cases where the TDMS update cycle is open are as follows:

I. Opening of the TDMS Update Cycle by a Host Command

When the write once recording medium 4 containing a final TDMS, more specifically, a lastly recorded TDDS, having C_flag=0 is loaded into the recording medium drive, the controller 2 receives a command of opening the TDMS update cycle from a host (not shown). Then, the controller 2 controls the recording/reading unit 1 to record a TDDS with C_flag=1 in a next TDMS position to the TDMS lastly recorded in the TDMA so as to indicate the TDMS update cycle open state. In this case, the value of C_flag changes but other information such as a TDFL does not change. Therefore, only a TDDS containing changed C_flag is recorded in a new cluster.

II. Opening TDMS Update Cycle According to Recording/Reading Operation

When the write once recording medium 4 having a lastly recorded TDDS with C_flag='0' is loaded into the recording medium drive and recording or reading of data is ready, the host sends a write/read command to the recording medium drive and the recording medium drive performs the recording/reading operation on the write once recording medium 4. If the TDMS needs to be updated during the recording/reading operation, the controller 2 controls the recording/reading unit 1 to record a TDDS with C_flag=1 in a next TDMS position to the TDMS lastly recorded in the TDMA so as to indicate the TDMS update cycle open state.

The TDMS is updated after the verify-after-write method once or several times or after writing a predetermined amount of data. At this time, the TDMS is updated to include C_flag=1 and recorded in the TDDS.

Similarly, defect management of updating a TDMS is also performed when a cluster is determined to contain a defect during reading of data from the write once recording medium 4.

After the state 110 where the value of C_flag is recorded to be 1 and the TDMS update cycle is open, a recording/reading operation (operation 30) is performed and a new TDMS is created and stored in the memory 3. For effective use of the TDMA, the controller 2 preferably performs updating of the TDMS by recording the TDMS in the TDMA only when the host gives a command of updating the TDMS (operation 50). At this time, the TDMS is updated so that C_flag=1 is included in the TDDS.

State 120 indicates a disc state, i.e., a TDMS update cycle open state having C_flag=1, in which the TDMS can be updated during the recording/reading operation (operation 30). In state 120, when the host gives a command of updating the TDMS (operation 50), the controller 2 updates the TDMS by including C_flag=1 to the TDDS and the TDMS update cycle reenters the state 100.

After the TDMS update cycle is opened in response to a command to open the TDMS update cycle given by the host or according to the recording/reading operation, a command to eject the write once recording medium 4 from the recording medium drive or a command of closing the TDMS update cycle is given (operation 40). Then, the controller 2 controls the recording/reading unit 1 to record a TDDS with C_flag=0 in the TDMA. Here, C_flag=0 indicates that the TDMS update cycle is closed. When the TDDS with C_flag=0 is recorded in the TDMA, the write once recording medium 4 enters the TDMS update cycle closed state 130.

If the host gives a command to close the TDMS update cycle rather than a command to eject the write once recording medium 4, the TDMS update cycle enters the state 130 and returns back to the state 100. In the state 130, when the host gives a command to eject the write once recording medium 4, the write once recording medium 4 is ejected from the recording medium drive (operation 70).

In the state 130, if a user gives a command of finalizing the write once recording medium 4, the controller 2 controls the recording/reading unit to record data such as "ffh" in a vacancy of the TDMA, thereby preventing recording of data, such as a TDMS that contains a TDDS, TDFL, or an SBM, in the TDMA.

As mentioned above, according to this embodiment of the present invention, C_flag that indicates two states of the TDMS update cycle, i.e., the TDMS update cycle open state and the TDMS update cycle closed state, is recorded in the TDMS. Therefore, it is possible to check whether an abnormal event, such as a power shortage in the recording medium drive, occurred during use of the write once recording medium 4. If a power shortage in the recording medium drive occurred during the use of the write once recording medium 4, the value of C_flag indicating that the TDMS update cycle was open must be finally recorded in the TDMA.

The TDMS is repeatedly recorded to increase the reliability of data detection. For instance, during updating of the TDMS, the TDMS is repeatedly recorded in continuous clusters of the TDMA, or a new TDMS is recorded in a primary TDMA and a copy of the new TDMS is recorded in a secondary TDMA.

Until now, defect management according to an embodiment of the present invention has been described with respect to a write once recording medium. However, the type of an information storage medium on which the defect management according to the present invention can be performed is not limited to this type of medium. That is, defect management for an information storage medium, according to the present invention, which uses an update cycle and cycle state information, is not limited to updating of a TDMS of a write once recording medium.

As mentioned above, there is a case where an abnormal event such as a power failure occurs when the recording medium drive records information, which is generated related to data recording or data reading, on a loaded information storage medium periodically or at any time during a recording/reading operation. In this case, supply of power to the recording medium drive is interrupted and the recording of the information is abnormally discontinued. According to an embodiment the present invention, when the information storage medium is reloaded into the recording medium drive, the recording medium drive determines the abnormal termination of the recording of information by referring to final update cycle state information.

FIG. 7 is a flowchart illustrating a defect management method for information storage media, according to an embodiment of the present invention. The defect management shown in FIG. 7 is performable using, for example, the drive shown in FIG. 4 or 5. Hereinafter, a defect management method for information storage media according to an embodiment the present invention will be described with reference to FIGS. 4 and 7.

First, an information storage medium is loaded in action 310. In action 320, an update cycle of specific information related to data recording or data reading is open. In this embodiment, the information storage medium may be, by way of non-limiting examples, an optical recording medium such as a digital versatile disc (DVD), or a hard disc.

Also, the information related to data recording or data reading is information that is generated on an information storage medium during recording or reading data and needs to be later recorded on the information storage medium for data reading. For instance, the data may be example, defect information regarding a data area of the information storage medium. As previously mentioned, the defect information is recorded in a TDMS formed on a write once recording medium or a DMA formed on a rewritable recording medium.

In this embodiment, the update cycle of the information is described as open response to a command to open the update cycle or a write/read command given by a host (not shown). However, it is to be understood that conditions of opening the update cycle may be differently set.

In action 330, when the update cycle of the information is open, the controller 2 controls the recording/reading unit 1 to record update cycle open state information in a predetermined area of the loaded information storage medium. The update cycle state information specifies the state of the update cycle using a consistency flag. If the value of the consistency flag is 1, the update cycle is open. If the value of the consistency flag is 0, the update cycle is closed.

In action 340, the controller 2 controls the recording/reading unit 1 to record data on or read data from the information storage medium.

In action 350, the controller 2 creates the specified information that needs to be updated whenever data is recorded on or read from the information storage medium.

In action 360, the controller 2 determines whether the update cycle of the information is completed or not. If it is determined in action 360 that the update cycle is not completed, the defect management routine returns to action 330, the information created in action 350 is recorded on the information storage medium, and the update cycle open state information is recorded thereon again.

However, if it is determined that the update cycle is completed, the information created in action 350 is recorded on the information storage medium and the update cycle closed state information is recorded thereon again, in action 370.

When recording the update cycle state information in action 330 or action 370, it is preferable that the update cycle state information is incorporated into the information and the information is recorded on the information storage medium. If the update cycle open state information is firstly recorded after the loading of the information storage medium, the recorded information is compared with previously recorded information and the information, in which only the update cycle state information changes from the update cycle closed state information to the update cycle open state information, is recorded.

As described above, defect management according to the disclosed embodiments of the present invention enables a recording medium drive to easily perceive abnormal termination of recording data on an information storage medium which was caused by an event such as interruption of power supply to the recording medium drive due to a power failure, when the information storage medium is reloaded into the recording medium drive.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined by the claims and their equivalents.

What is claimed is:

1. An apparatus for processing data recorded on an information storage medium, the apparatus comprising:
   a pickup emitting a light to transfer data with respect to the information storage medium; and
   a controller controlling the pickup to reproduce update status information of temporary management information which is updated according to use of the information storage medium, from a temporary defect management area and determining whether updating of the temporary management information is completed, based on the update status information,
   wherein the temporary management information comprises location information of a plurality of areas of the information storage medium, and a copy of the temporary management information is stored in a defect management area provided in a lead-in area of the information storage medium when the information storage medium is finalized.

2. An information storage medium comprising:
   a temporary defect management area comprising update status information of a temporary management information which is updated according to use of the information storage medium,
   wherein the temporary management information comprises location information of a plurality of areas of the information storage medium and a copy of the temporary management information is stored in a defect management area provided in a lead-in area of the information storage medium when the information storage medium is finalized, and
   whether updating of the temporary management information is completed, is determined based on the update status information.

3. A method for processing data recorded on an information storage medium, the method comprising:
   reproducing update status information of temporary management information which is updated according to use of the information storage medium, from a temporary defect management area; and
   determining whether updating of the temporary management information is completed, based on the update status information,
   wherein the temporary management information comprises location information of a plurality of areas of the information storage medium, and a copy of the temporary management information is stored in a defect management area provided in a lead-in area of the information storage medium when the information storage medium is finalized.

* * * * *